(12) United States Patent
Robbins

(10) Patent No.: US 7,796,285 B2
(45) Date of Patent: Sep. 14, 2010

(54) SUPPLEMENTING FACSIMILE IMAGE DATA

(75) Inventor: Kenneth L. Robbins, Sudbury, MA (US)

(73) Assignee: Dialogic Corporation, Montreal, Quebec (CA)

( * ) Notice: Subject to any disclaimer, the term of this patent is extended or adjusted under 35 U.S.C. 154(b) by 1366 days.

(21) Appl. No.: 11/252,818

(22) Filed: Oct. 18, 2005

(65) Prior Publication Data

US 2007/0086061 A1  Apr. 19, 2007

(51) Int. Cl.
G06F 3/12 (2006.01)
(52) U.S. Cl. .................... 358/1.15; 358/400; 358/402; 358/442; 379/100.11; 379/88.21
(58) Field of Classification Search .............. 358/400, 358/1.5, 403, 442, 402, 434, 407; 379/100.17, 379/100.06, 100.11, 88.21, 88.25, 905
See application file for complete search history.

(56) References Cited

U.S. PATENT DOCUMENTS

| | | | | | |
|---|---|---|---|---|---|
| 3,920,896 | A | * | 11/1975 | Bishop et al. | 379/100.13 |
| 4,791,491 | A | * | 12/1988 | Minowa | 358/443 |
| 4,873,577 | A | * | 10/1989 | Chamzas | 382/240 |
| 4,956,721 | A | * | 9/1990 | Tasaki et al. | 358/402 |
| 5,235,433 | A | * | 8/1993 | Clarkson et al. | 358/434 |
| 5,438,433 | A | * | 8/1995 | Reifman et al. | 358/468 |
| 5,502,574 | A | * | 3/1996 | Nakajima | 358/400 |
| 5,539,530 | A | * | 7/1996 | Reifman et al. | 358/402 |
| 5,541,993 | A | * | 7/1996 | Fan et al. | 380/243 |
| 5,550,646 | A | * | 8/1996 | Hassan et al. | 358/442 |
| 5,917,615 | A | * | 6/1999 | Reifman et al. | 358/468 |
| 6,005,672 | A | * | 12/1999 | Yoshida | 358/434 |
| 6,192,112 | B1 | * | 2/2001 | Rapaport et al. | 379/88.22 |
| 6,266,153 | B1 | * | 7/2001 | Davidson et al. | 358/1.9 |
| 6,628,414 | B1 | * | 9/2003 | Gabrielsen et al. | 358/1.15 |
| 7,209,264 | B2 | * | 4/2007 | Creamer et al. | 358/434 |
| 7,511,861 | B2 | * | 3/2009 | Hulan et al. | 358/404 |
| 2004/0042049 | A1 | * | 3/2004 | Hulan et al. | 358/404 |
| 2004/0138953 | A1 | * | 7/2004 | Van Luchene et al. | 705/16 |
| 2004/0236951 | A1 | * | 11/2004 | Zhao | 713/179 |
| 2006/0028693 | A1 | * | 2/2006 | Kagawa | 358/403 |

FOREIGN PATENT DOCUMENTS

| | | |
|---|---|---|
| EP | 0 459 792 | 12/1991 |
| EP | 0 652 666 | 5/1995 |
| EP | 0 817 461 | 1/1998 |
| EP | 0 827 330 | 3/1998 |
| GB | 2 366 468 | 3/2002 |
| WO | WO 01/09830 | 2/2001 |

* cited by examiner

Primary Examiner—Negussie Worku
(74) Attorney, Agent, or Firm—Weingarten, Schurgin, Gagnebin & Lebovici LLP

(57) ABSTRACT

The present disclosure provides supplemental data for facsimile image data representing an image of a document for transmission. The supplemental data can describe an aspect of the document, such as by uniquely identifying the document that the facsimile image data represents. The supplemental data can be provided with the image of the document, in a manner that will not essentially obscure the image of the document. The supplemental data can be in a machine readable form that identifies the document and that can be separate from the image of the document. The supplemental data permits facsimile transmitted documents to be processed automatically by facsimile connected systems.

47 Claims, 9 Drawing Sheets

SUPPLEMENTING FACSIMILE IMAGE DATA

Figure 1:
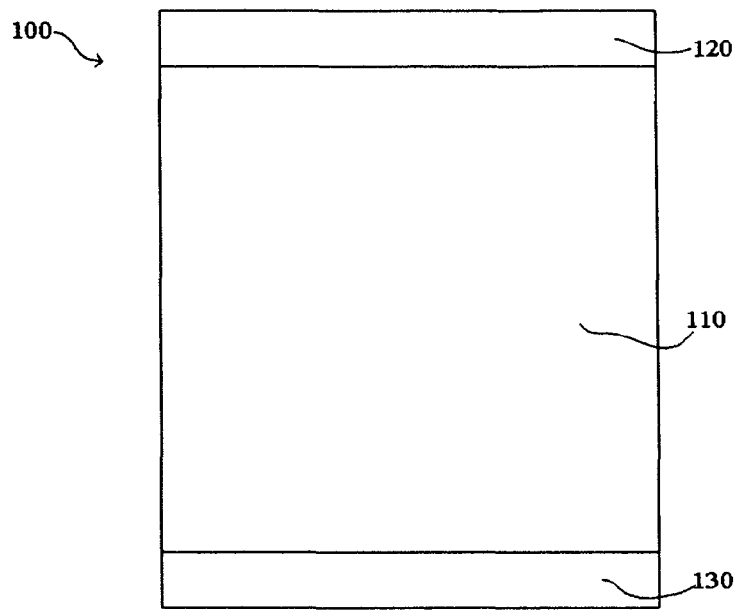

This description relates to supplementing facsimile (fax) image data.

When a document is faxed from one location to another, the document is represented in the transmitted fax image data as a two-dimensional image.

One way to handle the document at the receiving location is to have someone read and type information from the document into a computer, a step that is costly, prone to human error, and difficult to verify automatically.

Sometimes optical character recognition (OCR) is used to extract information automatically from a printed copy of the faxed document or directly from the received fax image data. Someone then verifies and corrects the information. OCR accuracy is limited by fax image quality, document orientation and skew, and the presence of non-standard typefaces or styles and fonts that are unusually large or small. OCR systems also are not aware of the structure of the recognized information, which limits their ability to enter the information from a document into corresponding database fields. This is especially true for a document that has a format that is not well-known, such as a purchase order that has a format chosen by the sender, not the recipient. Tuning an OCR system to a well-known form is costly and error-prone.

A received document can also be stored in a paper file or an electronic filing system (after review, but without data entry) without correlating the document or the information contained in it to its purpose. For example, a signed contract may be filed in one location in a filing system even though there are several possible other logical locations (e.g., in a customer file or a product file). A fax machine or a computer-based fax server may record the fact that a fax arrived at a particular date and time, and may record the transmitting subscriber identification (TSI).

Fax protocols typically provide for a header of characters to be added (by the transmitter) to the image of a fax document to identify, for example, the called number, the calling number, the number of pages, and the date and time of transmission.

Some applications enable a user, who chooses (and remembers) to do so, to include a barcode in the body of a document when the document is being created.

SUMMARY

In general, in one aspect, in connection with rendering fax image data representing an image of a document for transmission, supplemental data is also provided, in a manner that will not essentially obscure the image of the document, the supplemental data identifies the document and is not part of the image of the document.

Implementations may include one or more of the following features. The document is identified uniquely by the supplemental data. The supplemental data is rendered as part of the fax image data for transmission. The supplemental data is represented by a graphical element. The graphical element comprises machine-readable indicia. The machine-readable indicia comprises a bar code. The bar code comprises a 1D or 2D bar code. The machine-readable indicia comprises one or more glyphs. The machine readable indicia is outside the image of the document. The image of the document corresponds to an area that is bordered by areas that are not part of the image. The border areas comprise a header or footer or left margin or right margin.

The supplemental data is represented by characters rendered as part of the fax image data. The supplemental data comprises a time when the fax image data is transmitted and/or a digital signature of an entity and/or at least one of the following with respect to a sender of the fax data: name, fax number, telephone number. The supplemental data includes at least one of the following with respect to a recipient of the fax data: name, fax number, telephone number. The fax image data is transmitted by a fax device, and at least some of the supplemental data is provided by an application program that is not running on the fax device. At least some of the supplemental data is provided by a fax device when the fax image data is transmitted.

The transmitted fax image data is stored in a repository for use in processing the document after the fax image data has been transmitted. At least a portion the supplemental data comprises an index key to locate stored information in the repository.

An electronic version of the document is stored in a repository for use in processing the document after the fax image data has been transmitted. Structured data associated with content of the document is stored in a repository for use in processing information in the document after the fax image data has been transmitted. The electronic version comprises an image file. The structured data includes character information expressed in an editable format.

After the fax image data has been transmitted, making available at least one of an electronic version of the document, a copy of the transmitted fax image data, structured data associated with content of the document, and the supplemental data in a repository. The items are made available by responding to requests for service or by delivering them other than in response to a request.

In general, in one aspect, a version of supplemental data, which identifies a document and is received in connection with a receipt of fax image data corresponding to an image of the document, is used to access information associated with the document that was stored in connection with the transmission of the fax image data.

Implementations may include one or more of the following features. The document is identified uniquely by the supplemental data. The information is stored in a location under control of a sender of the fax image data, or of a recipient of the fax image data, or of a party other than a sender or a recipient of the fax image data. The access comprises a local area or wide area network access. The supplemental data is received as part of the fax image data. The supplemental data is transmitted as data. The supplemental data is received as data. The stored information includes transmitted fax image data. The stored information includes the supplemental information. The stored information includes additional information related to the document. The stored information includes structured data associated with content of the document.

In general, in one aspect, in connection with transmitting fax image data corresponding to images of two or more pages of a document, supplemental data is also transmitted, in a manner that will not essentially obscure the image, the supplemental data distinctly identifying each of the pages.

Implementations may include one or more of the following features. The distinct identification comprises a unique value. The unique value is assigned to the document. The unique value comprises a document number combined with a unique page number. The supplemental data is represented by a graphical element. The graphical element comprises machine-readable indicia. The machine-readable indicia comprises a bar code. The image of the document corresponds to an area that is bordered by areas that are not part of the image. The machine-readable indicia is in a header or footer relative to the document image. The border areas comprise a left margin or right margin. The supplemental data is represented by characters rendered as part of the fax image data.

In general, in one aspect, in connection with rendering fax image data representing an image of a document for transmission, identifying information is assigned to the document, the identifying information is incorporated in the fax image data and reported to an application. In some implementations, the fax image data is transmitted by a fax device and the application is not running on the fax device.

In general, in one aspect, information about a received fax document is derived using supplemental data that was incorporated into the fax document, by a fax device from which the fax document was sent, at the time of transmission.

Implementations may include one or more of the following features. The supplemental data comprises machine readable data incorporated into the fax document. The machine readable data comprises indicia. The indicia comprises at least one of a 1D barcode, a 2D barcode, or one or more glyphs. The derived information comprises either information that is contained in the machine-readable indicia or information that can be obtained from a repository using the derived information. The information that can be obtained from the repository comprises an image of the document, an electronic version of the document, additional information about the document, or structured information about content of the document. Additional information associated with the document is accessed using the derived information. The derived information identifies the document.

In general, in one aspect, a medium bears a fax document having non-character data in a header or footer, the data identifying the fax document. In some implementations, the non-character data comprises a machine-readable indicia, and the medium comprises paper or a digital representation.

In general, in one aspect, the fact that a fax document was transmitted at a specified date, time, and place is verified by scanning the document to extract non-character data that identifies the document, and using the non-character data to access information stored at the time the fax was transmitted, the stored information indicating the date, time, and place of transmission.

In general, in one aspect, a digital signature is encoded as part of a fax document. The digital signature is associated with data items. The data items comprise at least one of: date of transmission, time of transmission, number of pages, document ID, certificate authority, and a hash value of all encoded information. The data items include identifying information about a party. A signature envelope containing the digital signature and the associated data items is encrypted. The data items include only a unique identifier of the document and a hash value. The digital signature is used to access stored information including at least one of: a time of transmission, or an identifier of a sender of the document.

In general, in one aspect, a received fax document is associated with a stored version of the document using identification information transmitted as part of the fax.

Among the advantages of the above aspects and features are one or more of the following.

When bar coding is used, the header information is easily machine-readable. When faxes are serialized, they can be tracked and identified. A degree of authentication is made possible if the supplemental information includes certain information. A fax can be linked to a database using a value represented by the supplemental information. Later a database record and information used to generate the fax, among other things, can be accessed using the value as a key. This linkage between the key value and stored information allows, for example, information from a fax to be easily entered into a computer without the need to perform OCR. The supplemental information can be rendered on the fax without requiring involvement of a fax management application. When the barcode (or other machine readable indicia) is in the header or footer, the main body of the fax remains un-obscured. Because a fax normally includes a header or footer, the indicia can be added automatically to the fax without inadvertently obscuring any of the document (especially if "abut" mode is used). The indicia can be used to encode an actual transmission time. Faxes can be tracked and authenticated to aid compliance with regulations such as Sarbanes-Oxley and HIPAA. Using unique supplemental information for each page (say, by a document identifier and page number) reduces fraudulent and accidental page substitution. A set of pages may also be treated easily as a bundle.

Individual faxed documents and individual pages within those documents can be identified. The information allows better management and processing of faxed documents and extraction of information from the faxed documents.

In general, other aspects of the invention include such features and other features in combinations that include methods, apparatus, systems, program products, and other modes. Other advantages and features will become apparent from the following description and from the claims.

DESCRIPTION

FIG. 1 shows a page of a fax document.
FIGS. 2, 3, and 4a through 4i show fax document headers.
FIG. 5 is a block diagram of a fax device.
FIGS. 6 through 9 are flowcharts.
FIG. 10 is a block diagram of a fax system.

As shown in FIG. 10, a transmission of fax image data 1000 by a fax modem 1002 that is part of a fax device 1004 can be supplemented by information 1006 that, among other things, uniquely identifies the document 1007. Then the faxed document can later be identified, authenticated, supplemented, and processed with the aid of the supplemental information.

The supplemental information can be provided to a receiving location, for example, by transmission from the fax modem through a network or direct connection 1003 to another fax modem 1008 that is part of another fax device 1009 in the form, for example, of a barcode, characters, or other glyphs (or other machine-readable indicia) that are rendered as part of the fax image data, for example, as part of a header or footer. The supplemental information can also be provided using fields defined in fax protocols that are separate from the fax image data. In some cases, the supplemental information could be provided through a channel (not shown) that is separate from the fax transmission. When the supplemental information is not expressed in the form of machine-readable graphical information, it may be expressed, for example, as a string of binary value octets, or a string of alphanumeric characters.

The supplemental information need not apply to every fax document nor to every page of a given fax document.

Within the meaning of the term document, we include a single image or page or one or more images or pages that are related in some way. Within the meaning of the phrase fax image data, we include bits that are encoded as a two dimensional bitmap (e.g., in accordance with the ITU-T standard T.4 or T.6) when the document is rendered for transmission and that are then transmitted to a receiving device over a communications channel 1032. Within the meaning of the term render, we include the conversion of a document that is expressed in a native file format (e.g., as a word processing document, spreadsheet, or image) to the form of fax image data. Within the meaning of phrase fax modem, we include circuitry that modulates and demodulates fax image data on a carrier at either end of a bandwidth-limited channel and circuitry that enables the transmission of fax through a packet-switched network, such as an Internet protocol network, for example, using an FOIP (fax over IP) approach. Within the meaning of the term fax device, we include a combination of a fax modem with other circuitry and software used to control the hardware; the fax device could be, for example, a fax server or a fax machine or a multifunction peripheral (MFP). The fax device may be implemented, for example, in hardware such as by a fax machine, in software such as by a fax program that may be run on a PC platform, or a combination of hardware and software such as by a program that may run on a PC platform and a fax modem. Within the meaning of the term header or the phrase header or footer, we sometimes include a footer or a left or right margin or any other portion of a document page image that is reserved for use separately from the original document content.

Within the meaning of the term machine-readable indicia, we include 1D and 2D bar codes, glyphs, symbols, images, and characters, for example.

The fax device can be configured to perform insertion of the supplemental information 1006 into the fax image data in a variety of ways based, for example, on configuration parameters 1020 (or more generally, placement and/or rendering control information) that could include a placement location, a coding type, and the information to be encoded. The configuration parameters may cause the same indicia to be incorporated statically in the same way on every page of every document or to be changed dynamically for each document or even each page of each document. The dynamically changing information could include, for example, the current date, the time of transmission, a page number, and/or a unique page identifier (derived from a unique document identifier and the page number) at the time that the page is rendered for transmission. The configuration information may be provided from through a user interface of the fax device or a user interface of a fax application 1022, or from other sources.

The fax control software may, among other things, perform automatic scaling and resolution adjustment of machine-readable indicia as needed to enhance the ability of the receiving device to extract the supplemental information.

The supplemental information 1006 can be provided from an external source, such as the fax application 1022, or can be self generated in the fax device 1004 by fax control software 1028, or could be produced by any other application external to the fax device. The supplemental information for a fax can be provided from more than one source, for example, some of the information can be provided from the fax control software, and other supplemental information an be provided from the fax application.

In some implementations, the supplemental information that is to be transmitted is first converted to a machine-readable indicia by the fax application 1022. The fax application could either embed the resulting indicia in the document that is sent to the fax device for transmission or send it separately to the fax device for use in rendering the fax image data.

For example the fax application could convert the supplemental information to a barcode that appears in a header of the document as provided from the fax application to the fax device, based on the configuration parameters. Information 1027 about the document transmission (date, time, success or failure, for example) can be returned by the fax device to the fax application (or other application) and used by the application 1022 to correlate the supplemental information 1006 known to the fax application with details concerning the document transmission.

The document itself may be sent to the fax device 1004 (or other software or hardware not shown) for conversion from a document format 1011 to the fax data format.

As mentioned, in some cases, the supplemental information is determined dynamically by fax control software 1028 in the fax device and therefore is not created by or known to the fax application. In such cases, the fax control software can then send back to the fax application a data representation (typically in the form of a string of characters or a data structure) of the supplemental information.

The supplemental information 1006 can be logged by the fax application to a faxed-page database 1030 and correlated with a stored electronic version 1031 of the document, a stored image 1033 (e.g., an image file or an editable file) of the document, additional information 1035 about the document (for example, meta data such as author, modification time, time of transmission, etc.), structured information 1037 related to the content of the document, and other information 1019. In addition, fax transmission information 1013 may be provided by the fax device directly or indirectly through the fax application to the faxed-page database and stored in correlation with the other information related to the fax.

At the other end of the communication channel 1032, the supplemental information can be derived and used.

In cases in which the supplemental information is represented by a barcode (or other indicia) the supplemental information in the received fax document can be extracted from an image of the document by an image processing application 1050 either directly after the fax image data 1052 has been converted back to an image format 1054 by a converter 1053 in the receiving fax device 1009 or, after the document has been printed in paper form 1042 by a printer 1044 and a scanner 1043.

If the supplemental information is header data (e.g., sender name, sender fax and/or phone number, date and time, page number), then the received machine-readable version of the header data 1055 can be logged to a database 1056 by an application 1058. (In some circumstances, the database 1056 could be the same as or controlled by the same party as the database 1030.)

Information 1063 about the receipt of the fax (date, time, supplemental information not carried in the fax itself, for example) can also be logged to the database 1056 by the receiving fax device 1009. This stored (structured) data 1063 may be more complete and useful than a simple receipt log typically provided by a fax device. In addition, because the structured data may include or remain associated with an identifier 1065 of the document (and therefore with the document), stored information 1063 regarding receipt of the fax can later be verified by scanning the received fax document.

The fax device may also deliver an original scan 1071 (that is, supplemental information derived from the received fax image data) for storage in the database 1056. Then, a later scan of the fax document can be compared to the original scan 1071 to verify that the document being considered is indeed the document that was logged as received at a particular date, time, and location.

The automatically extracted supplemental information 1055 from the header can also be used by a server 1060 to electronically route a fax without performing OCR or using a human to read the document cover page. In addition, some implementations could be configured to also permit routing of the fax document could be routed using direct inward dialing (DID) information captured by the receiving fax device from the incoming call.

Returning to the transmission side of FIG. 10, a form of a digital signature 1062 from a sender may be included in the supplemental information, for example, in a barcode that is part of the transmitted fax image data. At the receiving end, the fax device can extract the digital signature and store it in database 1056 or the digital signature can be extracted later by an interested party. The digital signature enables authentication that a received fax document was actually transmitted by a purported sender and at the date and time identified on the fax. Additionally, the digital signature may also encode a page count 1067 and a unique document identifier 1065 to help confirm the document's authenticity.

The digital signature thus may wrap zero or more other data items such as a number of pages, a document identifier (ID), a certificate authority, or a hash value of all encoded information. The signature envelope (i.e., the signature with all data) could be encrypted. The signature could be simplified to wrap only the document identifier, signature authority, and hash value. In this case, the signature could be used to securely access stored information (say, from a signature authority 1081) to determine the document parameters such as transmission time and true sender identification.

Thus, an application receiving a fax with a bar-coded digital signature 1062 could verify the encoded information by scanning the barcode, decoding the barcode (using one or more of symbology decoding, decompression, and decryption technology), extracting the signature authority and the signature value 1062, and then accessing the signature authority to test the validity of the signature value. If the signature value is deemed to be valid, and the decoded checksum and hash values match the barcode data block, then the encoded data (e.g., transmission time, number of pages, and other data fields) could be extracted and trusted as valid. The receiver of the fax document could also use the decoded information for manual comparison with the document.

If the digital signature data section only encoded a document ID instead of multiple data fields, then an application 1073 working with the received document could access a remote and trusted repository 1070 using the digital signature and document ID to securely obtain document-related information (e.g., transmission time, number of pages) or any other information stored with relation to the original document or its transmission. For this purpose, the sender would have registered the document electronically with the trusted web site upon transmission (the trusted website could be an organization's internal web site or a site of a trusted third-party service provider).

In some cases, the trusted website could be associated with or under control of the database 1030.

Another use of the supplemental information would be to provide a link or correlation between a received fax document and an electronic version 1031 of the document to avoid the need for manual or OCR-based data entry. Even though the electronic version would be available without the need to send it by fax, the body of the fax document could be transmitted, in the conventional way, because it may contain a signature, or because the normal fax transmission may suit other workflow needs or carry more legal weight than email. To supplement the transmission with an electronic version of the data contained in the document, the barcode of the received fax is scanned to derive a unique document identifier 1065, e.g., a URL and a unique serial number that is used to automatically access a database such as database 1030 that contains information about the received fax document. This information would have been stored in the database, e.g., by the sender at the same time that the document was faxed.

The receiver could access the database using a URI 1080 (that is either explicit or implied within the barcode or the document itself) which will then return an XML document (or other structured data representation) 1037 describing the structured data provided on the fax. The receiver can use that information to populate the appropriate fields in a database among other things.

We now discuss some examples of headers and footers that use some of the techniques described above.

Referring to FIG. 1, a body 110 of a fax document is conveyed as a two-dimensional image of, for example, text generated by a word processor, a picture or a drawing generated by a graphics program, or any other of a wide variety of content that can be generated by a wide variety of applications or other sources. The fax document may include a header 120 and/or a footer 130 that may carry supplemental information related to the fax document. Any information represented in the header 120 may also be represented again in the footer 130 and vice versa. The document may also or alternatively include a left margin and a right margin that are clear of (do not obstruct or overlap) the content of the document.

The machine readable supplemental information that may be inserted in the header or the footer may include, for example, a unique identifier, a serial number, a character string, a copy of the header and the footer text, or a date and time of the start of the fax document transmission. The supplemental information may also include a current page number, a transmitting subscriber number, an arbitrary collection of characters or binary data, or names and fax/phone numbers of the sender and the receiver. The supplemental information may include a unique identifier of the transmitting fax modem and a channel (or session) identifier, a URI or a URL, IP addresses, email addresses, or SIP and other VoIP/FoIP addresses.

The supplemental information) may include metadata such as an author, a page count, a time of transmission, a document ID, or other document-related data. The supplemental information may also include data fields from the content of the document.

The supplemental information may be automatically inserted as non-character machine-readable indicia such as a barcode, a character string, or other graphical representations.

In the examples shown in FIGS. 4a-4i, the barcode is placed in the header, the footer, or both. However, the barcode may be located anywhere on the fax document and may be duplicated at different locations on the fax document to provide redundancy. The barcode may be on the opposite end of the fax document from the text header or footer. For example, if a header is text, the barcode may appear in the footer, and vice versa.

Additionally, the barcode may be a machine-readable version of the fax document header or footer.

Figure 2:
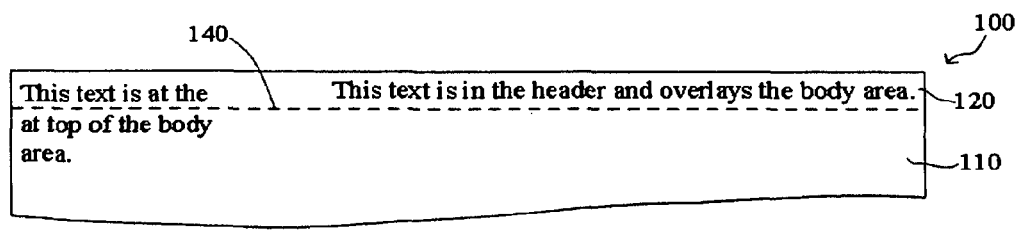
Figure 3:
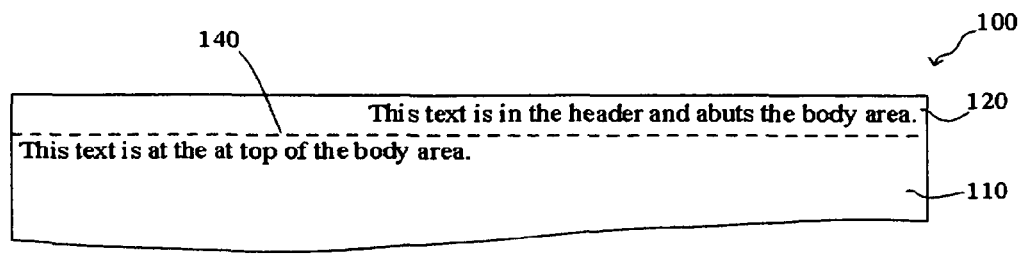

Referring to FIGS. 2 and 3, the barcode may appear on only the first page of the fax document or on any arbitrary set of pages or on all pages. The barcode may be the same for all pages on which it appears or may be unique from page to page, for example, by including the page number.

As shown in FIG. 2, the header may be placed in the area above and separated by an imaginary dashed line 140 from the body area 110. The header or footer may overlap the body area. The header or footer overlay may be rendered by a pixel-wise AND, OR, or XOR function in the fax image data. In some examples, all pixels under the barcode would be turned to white before the barcode is added.

In some examples, as shown in FIG. 3, the header and/or the footer abuts the body area, which adds to the overall length of the fax document.

In some examples, the barcode may be inserted into the body fax document, rather than in the header, which may cause a portion of the original fax document image to be obscured. In some examples, the body area of the fax document may be scaled so that when the header and footer are added (e.g., abutted) they do not add to the overall length of the document.

As shown in FIGS. 4a-4i, different types of fax document headers and footers and barcodes may be used. The information contained in a footer may be the same as or different from information in the header. Both headers and footers can be used on the same document.

Barcodes that store data in the widths and spacings of printed parallel lines are examples of one-dimensional (1D) barcodes. Barcodes that use patterns of dots or squares or concentric circles are referred to as 2-dimensional (2D) barcodes 150. Barcodes may be hidden in images, or may be expressed in a variety of types of symbologies.

The barcodes may be read by optical scanners called barcode readers or scanned from an image by barcode recognition/reading software. The barcode may include a unique fax modem and/or channel identifier such as an Ethernet MAC address or a channel number. The fax device may automatically scale the barcode to adjust the barcode to match the space and the resolution requirements of the fax document. Multiple barcodes may be used. The barcodes within the document may be simple copies of a common set of data, or each of the barcodes within the document may each be unique. The barcodes inserted into the header or footer may be 1D or 2D.

Figure 4A:
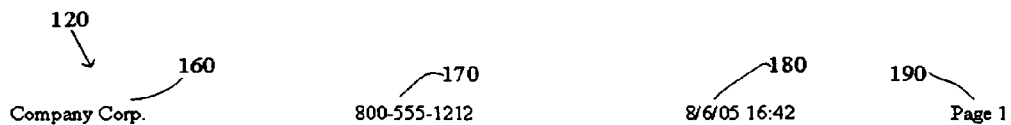
Figure 4B:
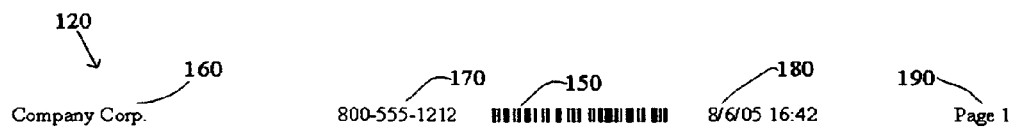
Figure 5:
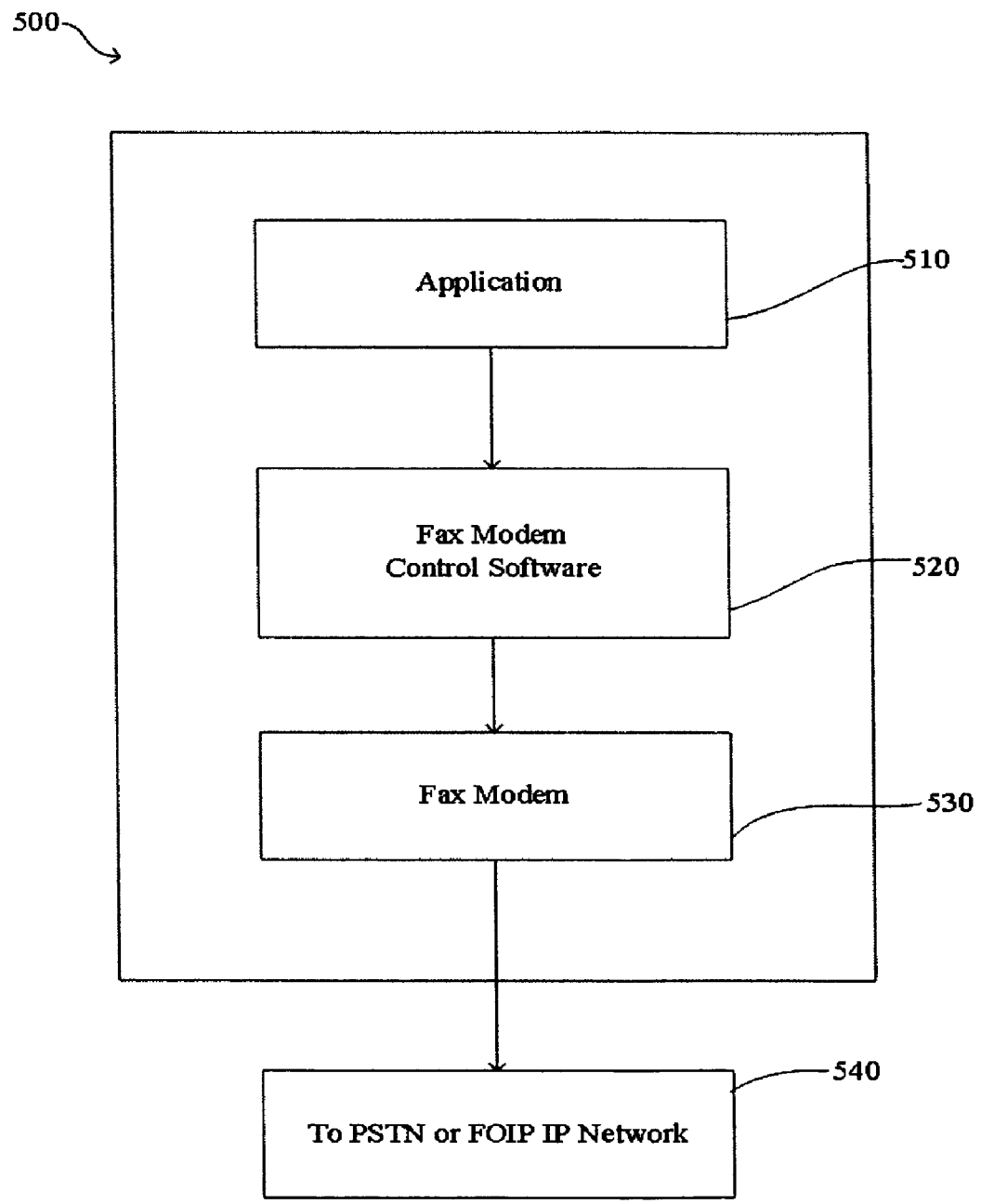

As shown in FIG. 4a, a typical header includes a name of a company 160 transmitting the fax document, a phone number 170 of the company, the date and time 180 that the fax document was transmitted, and the page number 190 of the current fax document page. FIG. 4b shows a small barcode inline with the header text, which includes the name of the company, the phone number, the date and the time, and the page number. Only the document ID number is bar-coded in this example.

Figure 4C:
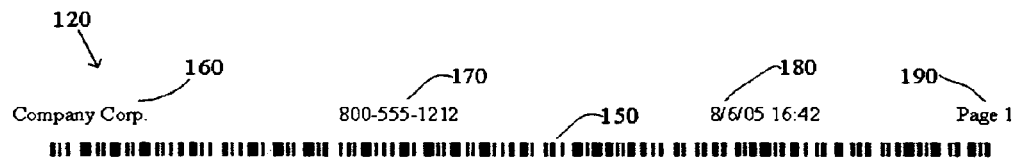
Figure 4D:

In FIG. 4c, a header has a large barcode 150 added below the header text, but within the header region 120. The large barcode 150 in FIG. 4d includes no accompanying text and could be used, for example, in the footer of a fax document to complement a header containing the text.

Figure 4E:
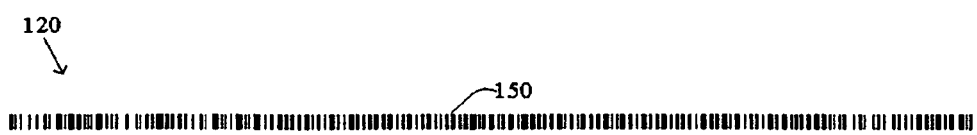

The large barcode in FIG. 4e encodes the exact text of the header 120 in FIG. 4a (with extra white space omitted) using a Code 128 symbology. Code 128 is an effective, high-density symbology that permits the encoding of alphanumeric data. The symbology includes a checksum digit for verification.

Figure 4F:
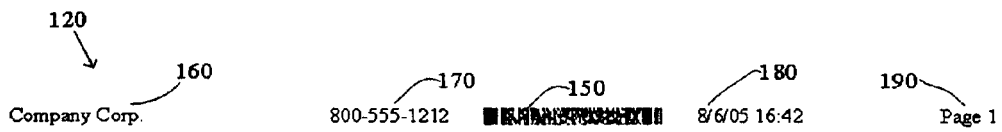
Figure 4G:
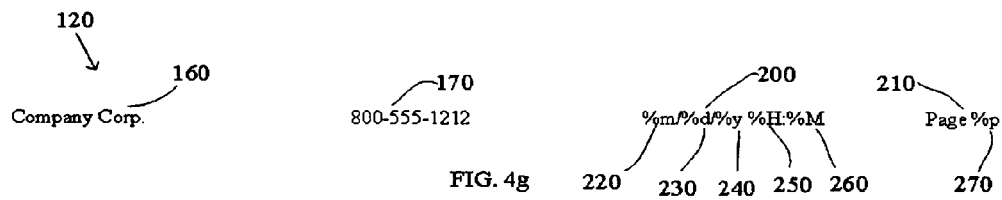
Figure 4H:
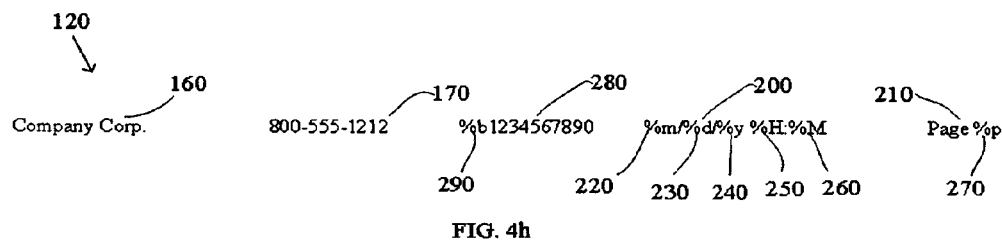
Figure 4I:
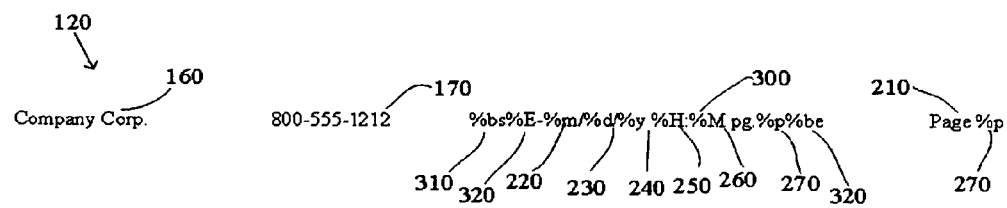

In FIG. 4f, a two-dimensional barcode 150 has been added inline with the header 120 text. The barcode 150 encodes the supplemental information using a PDF417 symbology. Another two-dimensional symbology that is effective for fax applications is Data Matrix. As shown in FIGS. 4g-4i (which illustrate specifications for header configurations; the use of the label 120 in each figure should be understood to refer to the element as a specification of a header rather than an actual header), text strings 200, 210, 280, and 300 may be used to control the generation of portions of the header text. In FIG. 4g, the two text strings 200 and 210 may be used to generate text elements in the header 120 of FIG. 4a. The tokens 220 through 270 that begin with a percent character represent substitutions that may be performed dynamically by the fax device, including the month (% m) 220, the day (% d) 230, the year (% y) 240, the hour (% H) 250, the month (% M) 260, and the page (% p) 270.

In FIG. 4h, the three text strings 200, 210, and 280 may be used to generate the header of FIG. 4b. The token (% b) 290 may be used to insert a barcode 150 with a value of 1234567890. In this example, the symbology is implied (Code 128) and the value for the barcode is explicitly set. Token % BH (not shown) may be used to encode the text of the header as a barcode (as shown in FIG. 4e) or % BF (not shown) may be used to encode the text of the footer as a barcode.

In FIG. 4i, text strings 210 and 300 include a token % E 320 representing the fax modem's Ethernet MAC address (a globally unique identifier). The token % bs 310 indicates the start of data to encode and token % be 320 indicates the end of data to encode. % SN (not shown) may be used to generate a unique serial number for the fax document or % sn (not shown) may be used to generate a unique serial number for each page.

Whenever the fax device 1004 dynamically generates the information to be included in the barcode, it may send the information 1027 to the application 1022 which may then correlate the data with the source document 1007 and store the information 1027 and optionally the document 1007 in the database 1030.

Referring to FIG. 5, main blocks 510 through 530 of a typical fax device 500 include an application 510 (also referred to as fax application 1022 on FIG. 10 and there shown outside of the fax device) that may process bi-tonal (black and white) or color images depending upon the application 510. The fax device 500 may be implemented using a computer, a printer, a fax machine, a scanner, or part of a multifunction printer/scanner/copier/fax (Multifunction Peripheral or MFP) device. Fax control software 520 (also referred to as 1028 in FIG. 10) may include protocols and specifications for transports, encoding schemes, and modulation data rates (e.g., T.30, T.4, T.6, V.34, V.17, V.29, etc.).

The T.30 specification is a portion of the ITU Telecommunication Standardization Sector (ITU-T) Group 3 fax standard that specifies procedures and protocols for fax transmission. The T.4 specification is a portion of the ITU-T Group 3 facsimile standard that specifies how image data is to be formatted. The T.6 specification is an ITU-T recommendation that uses the MMR two-dimensional compression coding technique to be used in the Group 4 black and white facsimile. A fax modem that follows the ITU-T V.34 recommendation implements a half-duplex mode of operation and supports data rates of 33.6 Kbps down to 2.4 Kbps in steps of 2.4 Kbps. This is a popular fax modem data rate for transfers of color images. A fax modem that follows and implements a ITU-T V.17 recommendation supports data rates of 14.4 Kbps. This implementation runs with an automatic fall back to slower connection rates of 12 Kbps, 9.6 Kbps, 7.2 Kbps so that it can still connect over noisy lines. A fax modem that follows and implements the ITU-T V.29 recommendation supports data rates of 9.6 Kbps.

The fax device (shown as 1002 in FIG. 10) may be implemented in hardware, software, or a combination of the two. The fax device may be internal to a computer, connected externally to a computer, or be a standalone fax machine, a fax modem in a printer, a fax modem in a scanner, or a fax modem in a multifunction printer/scanner/copier/fax (MFP) device.

In FIG. 5, the transmission channel 1032 (FIG. 10) may be the public switched telephone network (PSTN) or IP telephone networks 540. IP telephone or Voice over IP (also called VoIP, IP Telephony, Internet telephony, and Digital Phone) is the routing of voice conversations and fax transmissions over the Internet or any other IP-based network. The voice or fax data flows over a general-purpose packet-switched network, instead of traditional dedicated, circuit-switched voice transmission lines. Fax over IP (FOIP) refers to the transport of fax documents over Internet Protocol (IP) networks (e.g., using T.38 or T.37).

The fax document may be carried over T.38 and T.37 transports. ITU-T recommendation T.37 is a protocol designed to store and forward facsimile images over the Internet. ITU-T Recommendation T.38 specifies procedures for real-time group 3 facsimile communication over IP networks.

Figure 6:
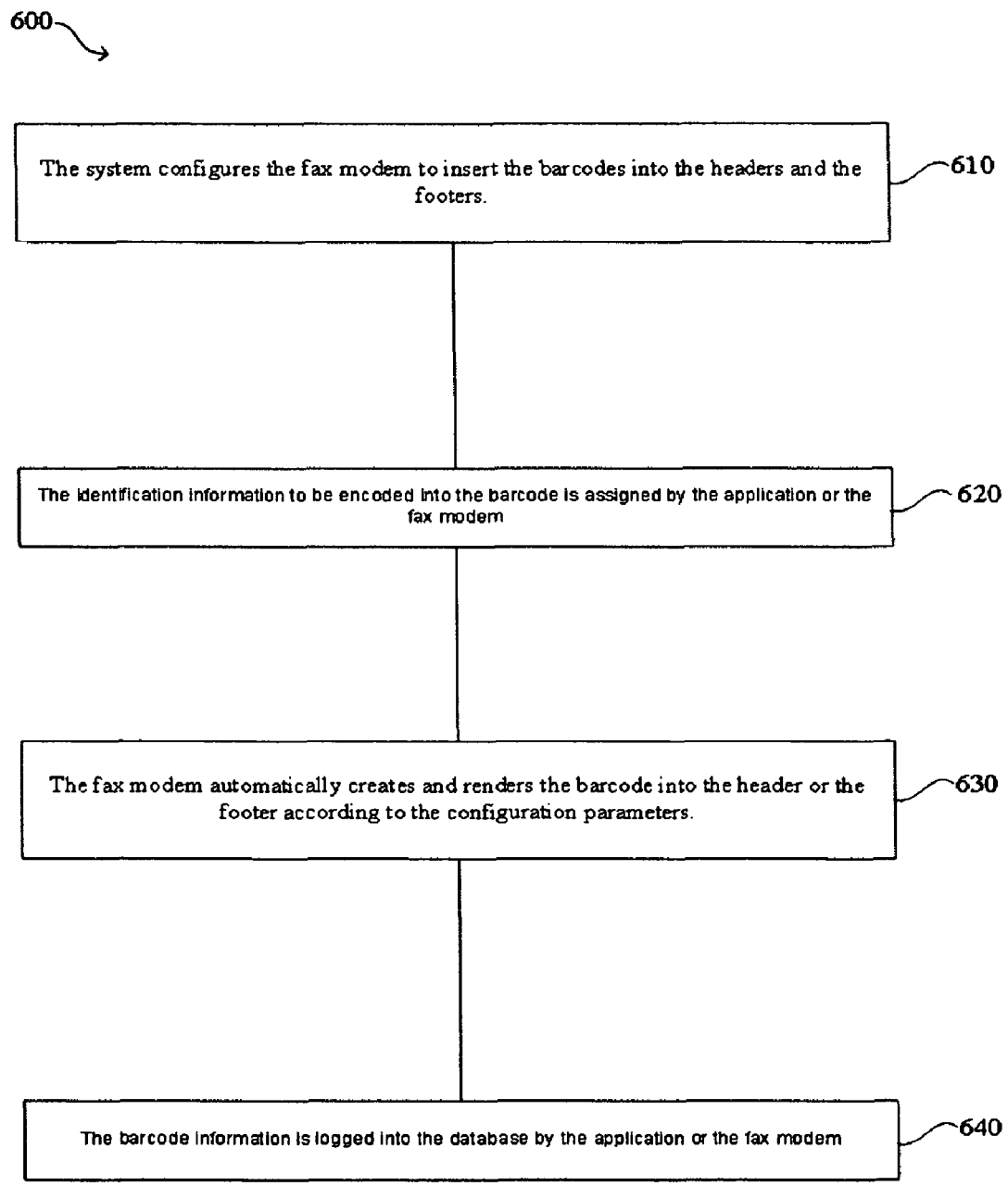

As shown in FIG. 6, in a method 600 for using a fax device to render 630 a barcode (or other indicia) into the header or footer is shown. The fax control software 520 configures 610 the fax device to do the inserting or rendering 630. The fax control software 520 of the application 510 may assign 620 to the fax device either the value to encode into a barcode, a control command to cause the fax device to create the value and then render it into a barcode, or an actual image representation of the barcode that the fax device will render 630 in the specified location (header, footer, or both).

The fax device 500 may configure 610 the fax device using configuration parameters 1020. The configuration parameters control features such as the placement, the coding type, and the information to be encoded 620 in the barcode. The configuration 610 may be static or dynamic and may be determined on a per-document basis. Once configured 610, the fax device automatically creates and renders 630 the barcode according to the configuration 610 parameters. The barcode may be generated just prior to the start of the fax document transmission when dynamic information such as the date and time 180 and the fax document 100 page number 190 are to be included. In some examples, the information to be encoded includes dynamic information that changes on a per-page 100 basis. In some examples, the dynamic information changes on a per-document basis. After the fax system 500 has created and rendered 620 the barcode into the header or footer, the information encoded in the barcode and other document and transmission information is logged 640 into the database 1030 by the application 510 or the fax device, or the fax modem control software 520.

For some configurations 610, the application 510 may directly assign the identification information to be encoded 620 in the barcode. In the direct configuration 610, the application 510 or the fax control software 520 acting as a proxy may log 640 the barcode information in correlation with the document transmission. For other configurations 610, the identification information may be encoded 620 into the barcode dynamically. In the dynamic case, the information encoded in the barcode and other document and transmission information 610 is only known to the fax device. In this situation, the fax device provides the data representation of the information encoded 620 in the barcode back to the fax control software 520 and/or the application 510 software. The information is typically in the form of a string of characters or a data structure. The returned information may then be logged 640 to a database allowing the information to be correlated with the source document and the source document data content.

Figure 7:
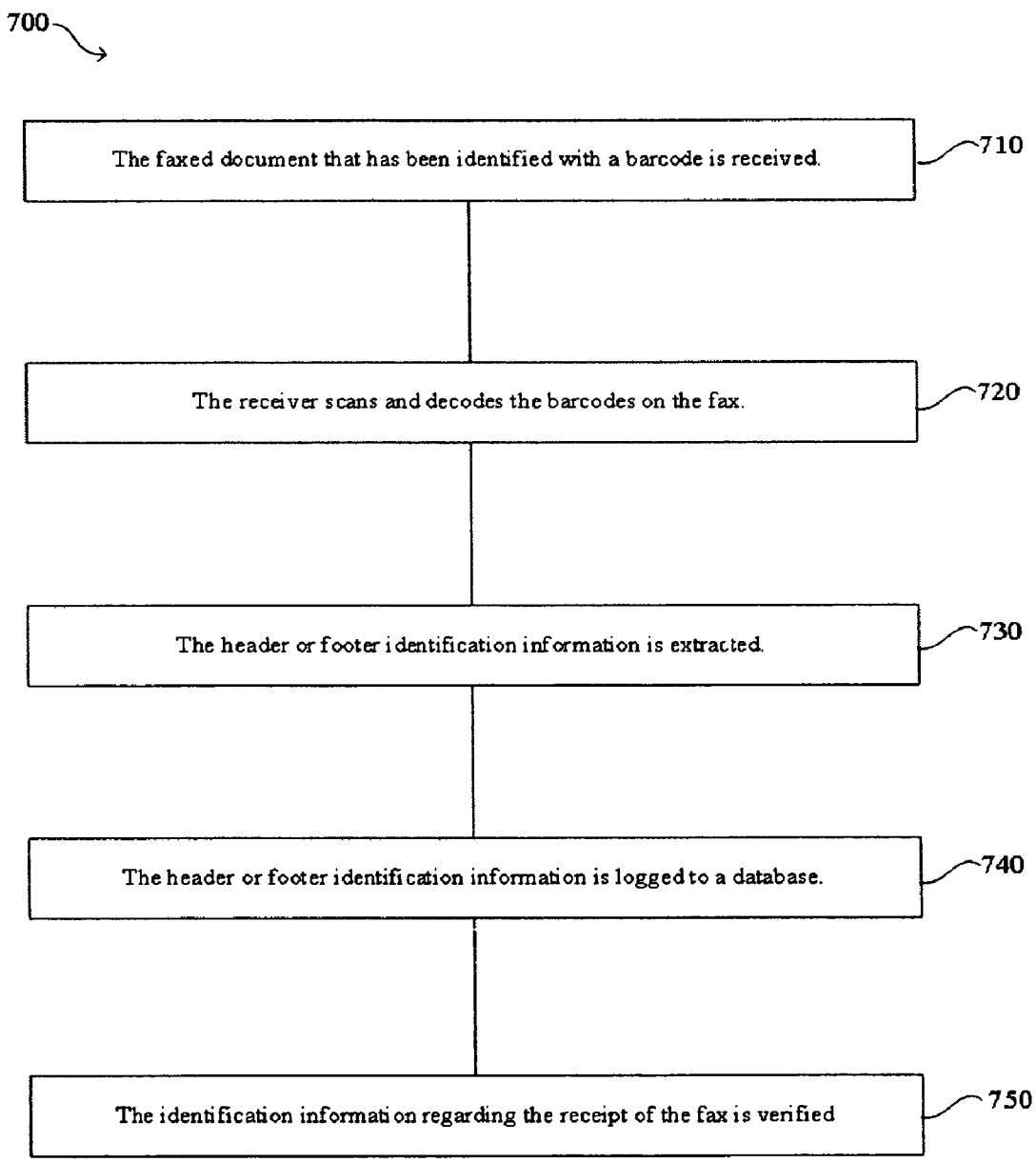

Referring to FIG. 7, in a method 700 for receiving a fax document that contains a barcode 150, the fax document is identified 710 as having a barcode 150 in the header or footer. The receiving fax device may use the barcode scanner device or the image processing software that reads the barcodes to scan and decode 720 the barcode. Depending on the type of information encoded, supplemental information may be extracted 730 by the fax modem control software 520. If the information encoded in the barcode is a representation of the typical header or footer information the fax modem control software 520 is provided with a machine-readable version of the header or footer data that may then be logged 740 to the database 1056. Automatic header extraction 730 may also be used to electronically route a fax document without performing optical character recognition (OCR) or using a human to read the document.

The structured data remains with the document. Therefore, when the fax document is used, the specific information regarding the receipt of the fax document may be verified 750 by scanning 720 the fax document. The later scan may be compared to an original scan that was logged in the database 1056. This allows for verification that the document is the same document that was logged 740 as received at a particular date and time 170 as well as location.

In addition, at the time of receipt, the receiver can compare its notion of a current time and compare it to what is encoded in the barcode. If the times are close, then it can log that fact and the actual received time and reported transmission time to the database. If there is a significant discrepancy, then the database can have both times noted which allows for a flag to be raised to indicate that the header may say one time but the document was actually received at a different time.

Figure 8:
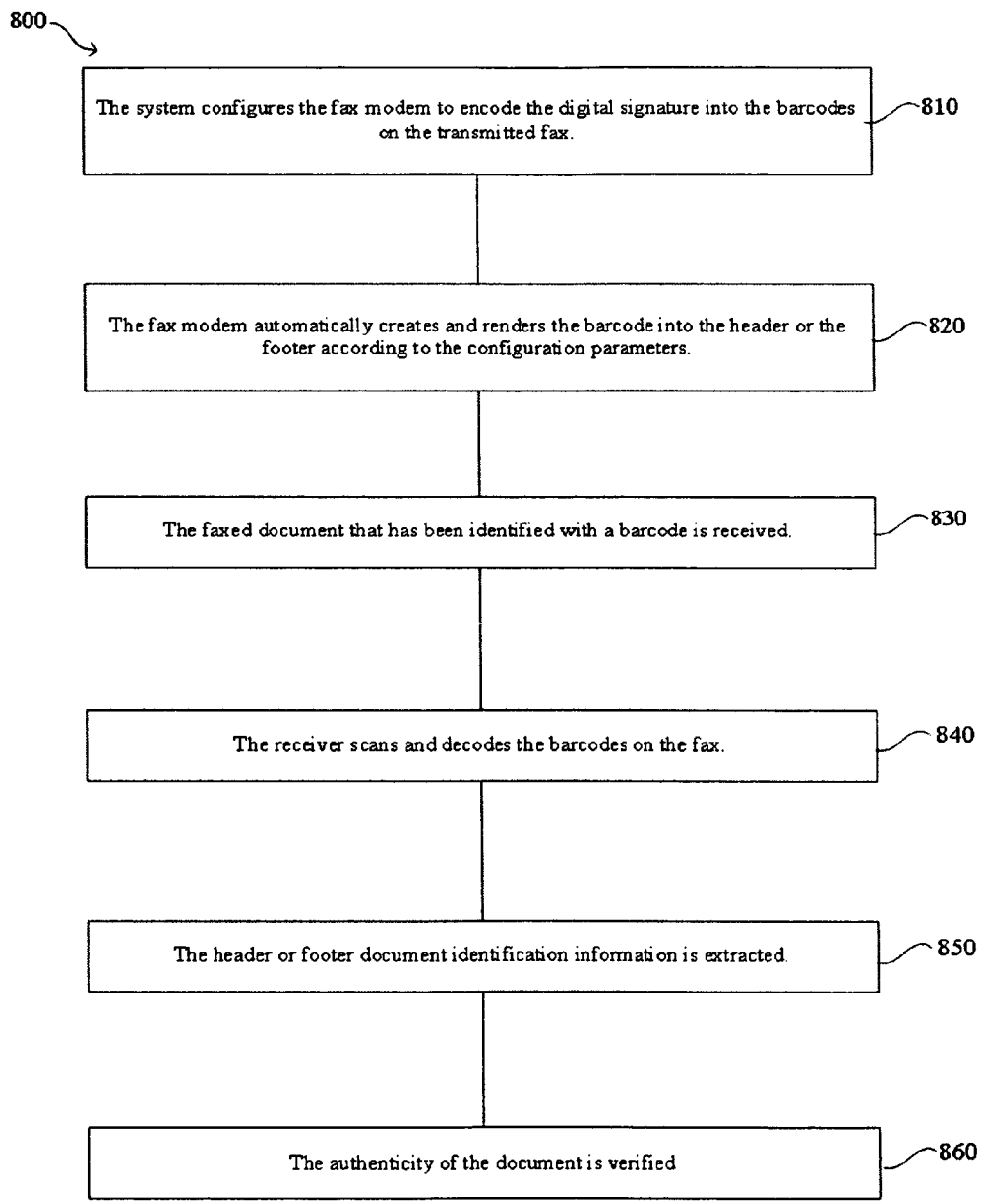

Referring to FIG. 8, in a method 800 for sending and receiving a fax document containing a digital signature, the fax device is configured to encode the digital signature and related supplemental information in the header or footer barcodes in the transmitted fax document. The fax device automatically creates and renders 820 the barcode into the header or footer. The barcode is created and rendered 820 according to the configuration parameters. The fax document is sent by the fax device to the intended recipient over the PSTN or FOIP Network 540. The fax document is received and identified as having a barcode 150 in the header or footer. The receiving fax system 500 scans and decodes 840 the barcodes. The header and footer document identification information is extracted 850. The authenticity 860 of the document is verified by reading the encoded digital signature and related supplemental information. This verification may include accessing a remote certificate authority 1081 to validate the digital signature 1062.

The encoding 810 of a form of a digital signature from the sender in the barcode may enable a degree of authentication 860 that the fax document was transmitted by the purported sender. The digital signature also provides a degree of authentication 860 that the fax document was sent at the date and time 180 listed on the fax document. Additionally, the signature may encode the page count and a unique document identifier in the barcode to help confirm the document's authenticity 860. A receiver of such a fax document would scan 840 the barcode and use decoding software to extract 850 the information and manually compare it to the document to verify authenticity 860.

In some examples, the receiver would scan 840 the barcode and have the scanning software 520 automatically lookup the document at a trusted web site 1070 to verify the document's authenticity 860 and integrity. For this operation, the sender would have registered the document electronically with the trusted web site upon transmission. The trusted site may be either the sending or the receiving organization's own internal web site or a trusted service provider. Receipt of the auxiliary information or authentication 860 may cause further actions to be automatically performed based on the business rules and workflow model of the sending or the receiving organization. One example may be to use the remote data access as a means to authenticate a given fax. Another example may be to use the remote data access to provide the electronic version of the document or data. Doing so would mean that the document would need not require OCR or manual data entry. The fax document 100 remains useful because it may contain a handwritten signature as well as a legal record of its transmittal date and time 180.

Figure 9:
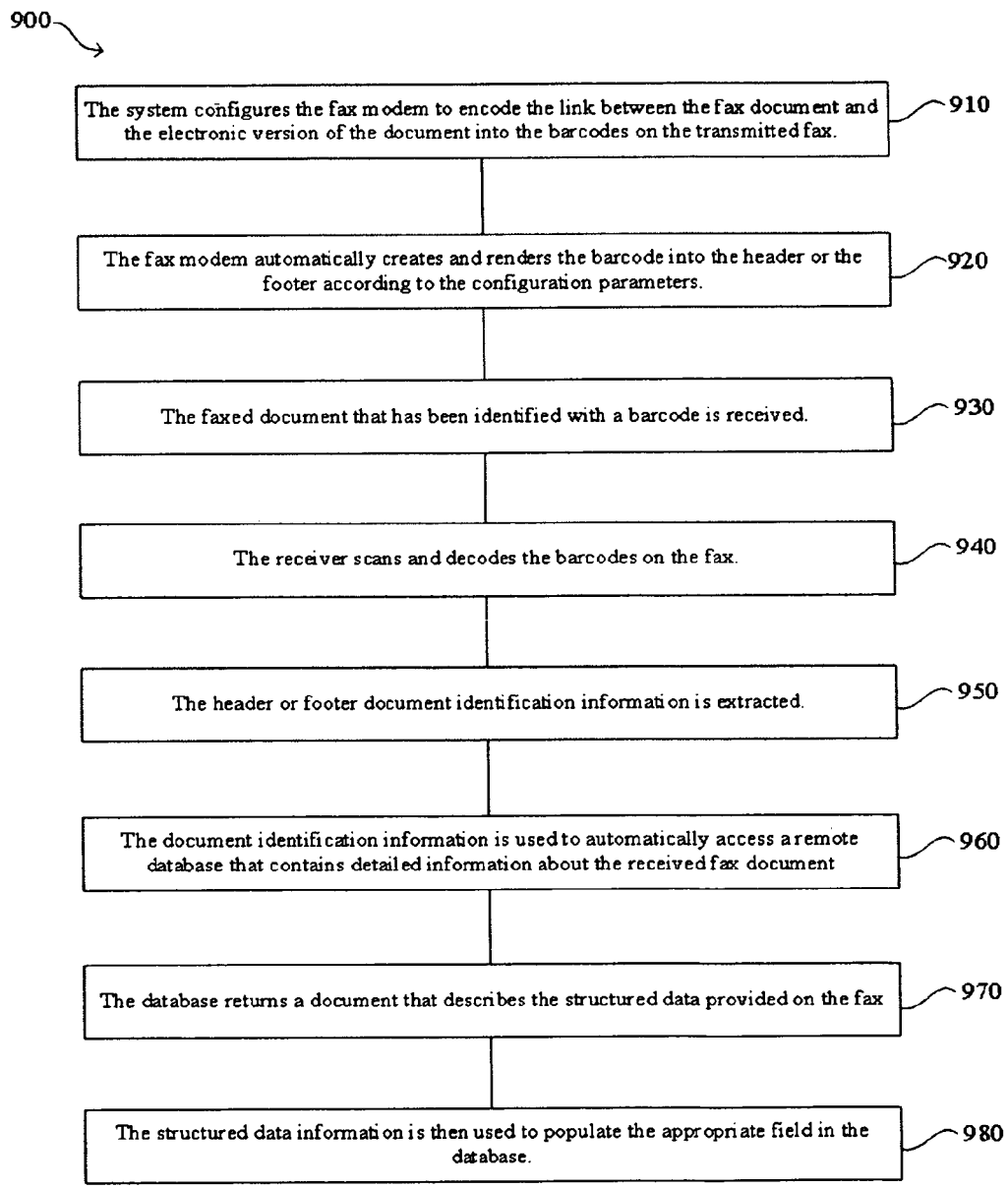
Figure 10:
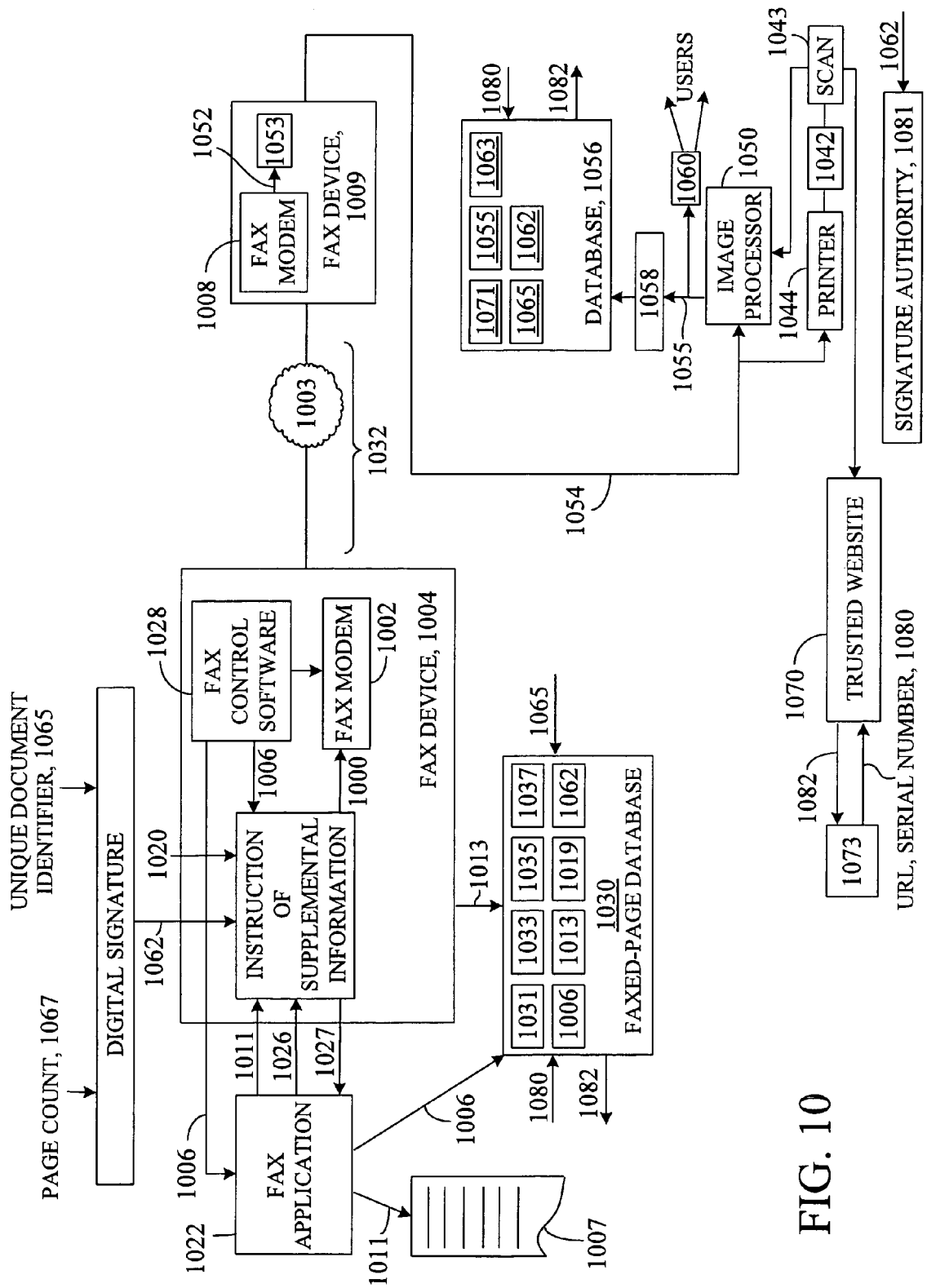

As shown in FIG. 9, a method 900 of document identification provides a link between a fax document and an electronic version of the document. The electronic version of the document may be in an image file format such as a TIFF file, a PostScript file, a PDF file, another type of digital image file, a word processing file, a spreadsheet file, an HTML file, a drawing file (e.g., CAD drawings), an XML file (structured data), a link to a database record or record set, or another type of file.

The method 900 avoids the need for manual or OCR-based data entry. The fax document is configured 910 with a barcode created and transmitted because it may contain a handwritten signature as in FIG. 8. Also, the transmission of the fax document may suit other workflow needs because fax document transmissions carry more legal weight than emails or file transfers. The fax document is received and identified 930 as containing a barcode. The barcode is scanned and decoded 940 and the header and footer information is extracted 950. However, in addition to the image transmission, there may be a need to enter the data from the fax document into a computer system. In this case, the barcode is scanned and decoded 940, and the resulting information (which, for example, may include a URL and a unique serial number or just a unique serial number) may then be used to automatically access 960 a remote database that contains detailed information (which may include an electronic version of the document) about the received fax document. This information would have been posted by the sender at the same time that the document was sent as a fax document. In a typical scenario, the receiver will access 960 the remote data source using a URI (that is either explicit or partially implied within the barcode or the document). Additional methods to access a remote database may include both push and pull approaches that use one or more of web access (using HTTP or HTTPS), FTP access, email (e.g., SMTP) using an automatic reply mechanism, web services protocols (HTTP with SOAP), or interactive voice response (via telephone). A proprietary protocol such as a business-to-business protocol may be used. Access could also be over a LAN or WAN. The database will then return 970 an XML document (or other structured data representation) describing the structured data provided on the fax document. The receiver can then use that information to populate 980 the appropriate fields in a database.

Within the meaning of the term pull, we include a system in which a transmitter posts information (locally) and a receiver pulls from the information from the posted location. Within the meaning of the term push, we include a system in which the transmitter pushes the data to the receiver (for example, over a data network rather than PSTN). For example, the transmitter might email, FTP, or HTTP POST the document and supplemental data to the receiver's computer. Then, when the receiver performs an access, the access is local.

We have referred to the use of a unique document identifier as part of the supplemental information associated with a fax document. The document identifier could be unique among a universe that is global or relates only to an enterprise, a group within an enterprise, a certain piece of hardware or any other group or physical structure. Such fax document identifiers may be assigned by a fax device that is sending documents, by a fax application, or by a global authority or sub-authority.

Other implementations are also within the scope of the following claims.

Although much of the earlier discussion refers to supplemental data that is transmitted using graphical devices that are added to the fax image data and interpreted at the receiving end, the supplemental data may also be sent non-graphically, for example, using T.30 information packets (for example, NSF, PWD, SUB, SEP, TSI, and other application settable fields among others referred to as FIF—Facsimile Information Fields). In addition, the supplemental data could be sent to the receiving end by methods other than using fax protocol fields or fax transmission, and then associated with the fax at the receiving end. For example, the supplemental information could be sent as part of call setup information such as in a user-supplied Information Element in an ISDN message. Or, the supplemental information could be sent as part of a SIP or H.323 message, for example, a SIP INVITE message or a SIP INFO message.

For example the information could be sent by a supplemental phone call, or by email, or otherwise through the Internet from computer to computer.

The invention claimed is:

1. A method for processing a document for facsimile transmission, the method comprising:
   rendering facsimile image data representing an image of the document for facsimile transmission;
   generating supplemental data that identifies the document, for facsimile transmission with the facsimile image data, the supplemental data permitting automated processing in connection with facsimile transmission of the supplemental data and facsimile image data based on identification of the document, the supplemental data being generated based on one or more parameters associated with the document or facsimile transmission of the facsimile image data representing the image of the document;
   providing, in a manner that will not essentially obscure the image of the document, the supplemental data separately from the image of the document; and
   facsimile transmitting the facsimile image data with the supplemental data.

2. The method of claim 1 in which the document is identified uniquely by the supplemental data.

3. The method of claim 1 in which the supplemental data is rendered as part of the facsimile image data for transmission.

4. The method of claim 1 in which the supplemental data is represented by a graphical element.

5. The method of claim 4 in which the graphical element comprises machine-readable indicia.

6. The method of claim 5 in which the machine-readable indicia comprises a bar code.

7. The method of claim 6 in which the bar code comprises a 1D bar code.

8. The method of claim 6 in which the bar code comprises a 2D bar code.

9. The method of claim 5 in which the machine-readable indicia comprises one or more glyphs.

10. The method of claim 5 in which the image of the document corresponds to an area that is bordered by areas that are not part of the image.

11. The method of claim 10 in which the border areas comprise a header or footer.

12. The method of claim 10 in which the border areas comprise a left margin or right margin.

13. The method of claim 5 in which the machine readable indicia is outside the image of the document.

14. The method of claim 1 in which the supplemental data is represented by characters rendered as part of the facsimile image data.

15. The method of claim 1 in which the supplemental data comprises a time when the facsimile image data is transmitted.

16. The method of claim 1 in which the supplemental data comprises a digital signature of an entity.

17. The method of claim 1 in which the supplemental data includes at least one of the following with respect to a sender of the facsimile data: name, facsimile number, telephone number.

18. The method of claim 1 in which the supplemental data includes at least one of the following with respect to a recipient of the facsimile data: name, facsimile number, telephone number.

19. The method of claim 1 in which the facsimile image data is transmitted by a facsimile device, and at least some of the supplemental data is provided by an application program that is not running on the facsimile device.

20. The method of claim 1 in which at least some of the supplemental data is provided by a facsimile device when the facsimile image data is transmitted.

21. The method of claim 1 also including storing the transmitted facsimile image data in a repository for use in processing the document after the facsimile image data has been transmitted.

22. The method of claim 21 in which at least a portion the supplemental data comprises an index key to locate stored information in the repository.

23. The method of claim 1 also including storing the supplemental data for use in processing the document after the facsimile image data has been transmitted.

24. The method of claim 23 in which at least a portion the supplemental data comprises an index key to locate the supplemental data in a database.

25. The method of claim 1 also including storing an electronic version of the document in a repository for use in processing the document after the facsimile image data has been transmitted.

26. The method of claim 25 in which at least a portion the supplemental data comprises an index key to locate the electronic version in the repository.

27. The method of claim 25 in which the electronic version comprises an image file.

28. The method of claim 25 also including storing structured data associated with content of the document in a repository for use in processing information in the document after the facsimile image data has been transmitted.

29. The method of claim 28 in which the structured data includes character information expressed in an editable format.

30. The method of claim 28 in which at least a portion the supplemental data comprises an index key to locate the structured data in the repository.

31. The method of claim 1 also including making available after the facsimile image data has been transmitted, at least one of an electronic version of the document, a copy of the transmitted facsimile image data, structured data associated with content of the document, and the supplemental data in a repository.

32. The method of claim 31 in which making available comprises responding to requests for service.

33. The method of claim 31 in which making available comprises delivering other than in response to a request.

34. A method for facsimile transmission of at least a portion of a document, the method comprising:

transmitting, via facsimile transmission, facsimile image data corresponding to images of two or more pages of the document;

generating supplemental data that distinctly identifies each of the two or more pages, the supplemental data permitting automated processing in connection with the transmitted facsimile image data based on the distinct identification of the two or more pages, the supplemental data being generated based on one or more parameters associated with the document or the facsimile transmission of the facsimile image data; and transmitting, via facsimile transmission, in a manner that will not essentially obscure the images of the two or more pages, the supplemental data that distinctly identifies each of the two or more pages with the facsimile image data.

35. The method of claim 34 in which the distinct identification comprises a unique value.

36. The method of claim 35 in which the unique value is assigned to the document.

37. The method of claim 35 in which the unique value comprises a document number combined with a unique page number.

38. The method of claim 34 in which the supplemental data is represented by a graphical element.

39. The method of claim 38 in which the graphical element comprises machine-readable indicia.

40. The method of claim 38 in which the machine-readable indicia comprises one or more glyphs.

41. The method of claim 38 in which the machine-readable indicia comprises a bar code.

42. The method of claim 41 in which the bar code comprises a 1D bar code.

43. The method of claim 41 in which the bar code comprises a 2D bar code.

44. The method of claim 38 in which each image of each of the two or more pages of the document corresponds to an area that is bordered by areas that are not part of the image.

45. The method of claim 44 in which the graphical element is in a header or footer relative to the document image.

46. The method of claim 44 in which the border areas comprise a left margin or right margin.

47. The method of claim 34 in which the supplemental data is represented by characters rendered as part of the facsimile image data.

* * * * *